United States Patent [19]

Epstein et al.

[11] Patent Number: 5,584,448
[45] Date of Patent: Dec. 17, 1996

[54] FLIGHT CONTROL DEVICE

[75] Inventors: Moshe Epstein, Haifa; Moshe B. Ezri, Ramat Yishai, both of Israel

[73] Assignee: State of Israel Ministry of Defense, Rafael Armaments Development Authority, Haifa, Israel

[21] Appl. No.: 347,800

[22] Filed: Dec. 1, 1994

[30] Foreign Application Priority Data

Dec. 2, 1993 [IL] Israel ......................... 107844

[51] Int. Cl.$^6$ ..................................... F42B 10/14
[52] U.S. Cl. .......................................... 244/3.28
[58] Field of Search ........................ 244/3.28, 3.27, 244/3.29, 3.3, 49; 114/282

[56] References Cited

U.S. PATENT DOCUMENTS

| | | | |
|---|---|---|---|
| 3,154,015 | 10/1964 | Muller | 244/3.24 |
| 3,918,664 | 11/1975 | Grosswendt | 244/3.28 |
| 4,323,208 | 4/1982 | Ball | 244/3.28 |
| 4,398,682 | 8/1983 | Bithrey | 244/3.29 |
| 4,523,728 | 6/1985 | Frazer | 244/3.29 |
| 4,560,121 | 12/1985 | Terp | 244/3.22 |
| 4,575,025 | 3/1986 | Sadvary et al. | 244/3.27 |
| 4,660,786 | 3/1987 | Brieseck et al. | 244/3.24 |
| 4,702,436 | 10/1987 | Arnell | 244/3.28 |
| 4,844,386 | 7/1989 | Brieseck | 244/3.28 |
| 5,108,051 | 4/1992 | Montet et al. | 244/3.28 |
| 5,249,761 | 10/1993 | Schroppel | 244/3.21 |

FOREIGN PATENT DOCUMENTS

| | | |
|---|---|---|
| 1528934 | 6/1968 | France . |
| 2226641 | 11/1974 | France . |
| 1187035 | 8/1967 | United Kingdom . |
| 1307298 | 2/1973 | United Kingdom . |
| 1431744 | 4/1976 | United Kingdom . |
| 2041502 | 6/1980 | United Kingdom . |
| 2150092 | 6/1985 | United Kingdom . |
| 2214882 | 3/1989 | United Kingdom . |
| 2246330 | 1/1992 | United Kingdom . |

*Primary Examiner*—Michael J. Carone
*Assistant Examiner*—Christopher K. Montgomery
*Attorney, Agent, or Firm*—Michael N. Meller

[57] ABSTRACT

A flight control device is described for a flying object assembly. The assembly has a plurality of fins symmetrically disposed thereabout. Each of the fins is movable between a retracted position and an extended position. A support is provided for the flight control device. The flight control device further includes a frame for each fin which is connected to the fin by a pivot and is freely movable with respect to the support. The fin can be angularly displaced about the pivot. A main shaft is rotatably supported on the support and is coaxial with the axis about which the frame is movable. Also provided on the support, is a motor having a motor shaft. Included, are rotating means connecting the motor to rotate the main shaft. A guide is actuated by the main shaft and a follower which is carried by the fin engages the guide to angularly displace the fin about the pivot when the guide is actuated by the motor. In this way, the angular displacement of each of the fins can be controlled in the flight control device.

19 Claims, 6 Drawing Sheets

FLIGHT CONTROL DEVICE

FIELD OF THE INVENTION

The invention relates to flight control devices for flying objects, in particular rockets, missiles and the like, and particularly to a device which imparts to fins, with which such apparatus are provided, the desired orientation at each moment of the flight.

BACKGROUND OF THE INVENTION

Rockets, missiles and like flying objects (for brevity's sake reference will be made henceforth to rockets only, but this is not to be construed as implying a limitation to the scope and possible applications of the invention) are provided with a plurality of symmetrically arranged fins, the slant of which with respect to a plane perpendicular to the axis of the flying object can be changed during the flight to control the same according to a predetermined flight plan. Said fins are ordinarily retracted prior to launching the rocket and assume an extended position, outwardly of the rocket body, when the same leaves the launching pad. In flight, the fins remain oriented in the vicinity of a plane perpendicular to the rocket axis. However, they are not rigidly fixed and their slant with respect to that plane may be changed due to the flight, in order to carry out the predetermined flight plan. A programmed flight control apparatus determines what the slant of the fins should be at each point of time and sends a signal to that effect to actuating means which concurrently control the orientation of the fins. A plurality of fins, e.g., four of them or more, are generally symmetrically disposed about the periphery of the rocket and at or near the base of the rocket and they are concurrently actuated to assume the desired slant by a centralized kinematic mechanism.

Existing mechanisms for controlling the slant of the fins are not satisfactory for many reasons, in particular because they are extremely complicated and take up more space than is desired in view of the fact that they must be housed in the inside of the rocket, where space saving is a primary consideration. Furthermore, their very complication creates the possibility of malfunctions or even failure.

It is a purpose of this invention to eliminate these drawbacks, and specifically, to provide a flight control device, applicable to a flying object assembly such as a rocket assembly, comprising means for imparting to the fins the slant desired at any moment of the flight, which is simple, space-saving and of low cost.

It is another purpose of this invention to provide such a device which is effective and free from the danger of failure or malfunctions.

It is a further purpose of the invention to provide such a device which is composed of a minimum of component parts.

It is a still further purpose of this invention to provide such a device that is economical and easy to assemble and to operate.

Other purposes and advantages of the invention will appear as the description proceeds.

SUMMARY OF THE INVENTION

The flight control device according to the invention is characterized in that it comprises, in combination with a rocket assembly:

a base rigid with said rocket assembly;

a main shaft rotatably supported in said base;

a frame freely pivoted on an axis coaxial to said main shaft;

guide means actuated by said main shaft;

a motor supported on said base;

kinematic means connecting said motor to said main shaft whereby to actuate the same for rotation when the motor is actuated;

a pivot carried by said frame and lying on a plane substantially perpendicular to said main shaft;

a fin swingably mounted about said pivot;

a follower carried by said fin and engaging said guide means, whereby to swing said fin about said pivot when said guide means is actuated by said motor;

said frame being swingable with respect to said base from an inoperative position, wherein said fin is substantially retracted within a surface enveloping said rocket assembly, to an operative position, wherein said fin extends outwardly of said surface; and means for causing said frame to assume said operative position in the absence of external constraints.

The entire flight control device is controlled by an electronic control system. The control system determines at all times the angular position of the motor and of its shaft and therefore of the fin, as well as the moments in which the motor should be activated or inactivated. Such control systems are known in the art and therefore need not be described here.

A plurality of devices as hereinbefore described (e.g. four) are generally provided to actuate a plurality of fins symmetrically disposed about the periphery of the rocket.

Further, preferably the flight control device according to the invention has one or a plurality of the following preferred features:

the frame is pivoted on the main shaft;

the surface enveloping the rocket assembly is a cylindrical surface, and preferably a circular cylindrical surface, tangent to said base periphery portion and coaxial with the rocket assembly (the word "cylindrical", as used herein, does not necessarily refer to a circular cylinder but is applicable to any surface which can be generated by a line moving parallel to itself);

the frame comprises boundary elements which define an inner space therebetween, at least one of said boundary elements having an opening therein;

the guide means are cam means; more preferably they are rotatable cam means, keyed to the main shaft; and still more preferably, said cam means comprise a rotatable, essentially cylindrical cam body keyed to the main shaft and having therein a shaped cam groove;

the device according to the invention additionally comprises means for measuring the angular displacement of the fin, preferably through the angular displacement of the cam means, when these are provided, from a reference position, which means are preferably potentiometer means coaxial with the main shaft;

the kinematic connection between the motor and the main shaft comprises a pinion-toothed wheel coupling, the pinion being preferably keyed to the motor shaft and positioned in the inner space of the frame and the toothed wheel being keyed to the main shaft;

the motor shaft extends into the inner space of the frame, and said aperture in one of the frame boundary elements preferably comprises an arcuate portion through which the motor shaft extends during the swinging of the frame from its inoperative to its operative position;

the plane perpendicular to the main shaft on which said pivot carried by the frame lies, passes through the axis of the rocket assembly;

said pivot is removably mounted in the frame;

the follower carried by the fin is a projection, preferably pin-shaped, engaging the cam groove;

the means for causing the frame to assume its operative position in the absence of external constraints are elastic means, and preferably comprise springs connected to the rocket assembly and the frame in such a positioned relationship thereto that the spring elastic force produces a moment about the main shaft which tends to rotate the frame from its inoperative to its operative position (which means that the two vectors representing said moment and said rotation have the same direction and sign);

the aforementiond constraints are essentially constituted by the tube of the launcher pad in which the rocket is housed before it is launched, which is not different from the launcher pad tubes known in the art and customarily used for launching rockets.

DETAILED DESCRIPTION OF PREFERRED EMBODIMENTS

Figure 1:
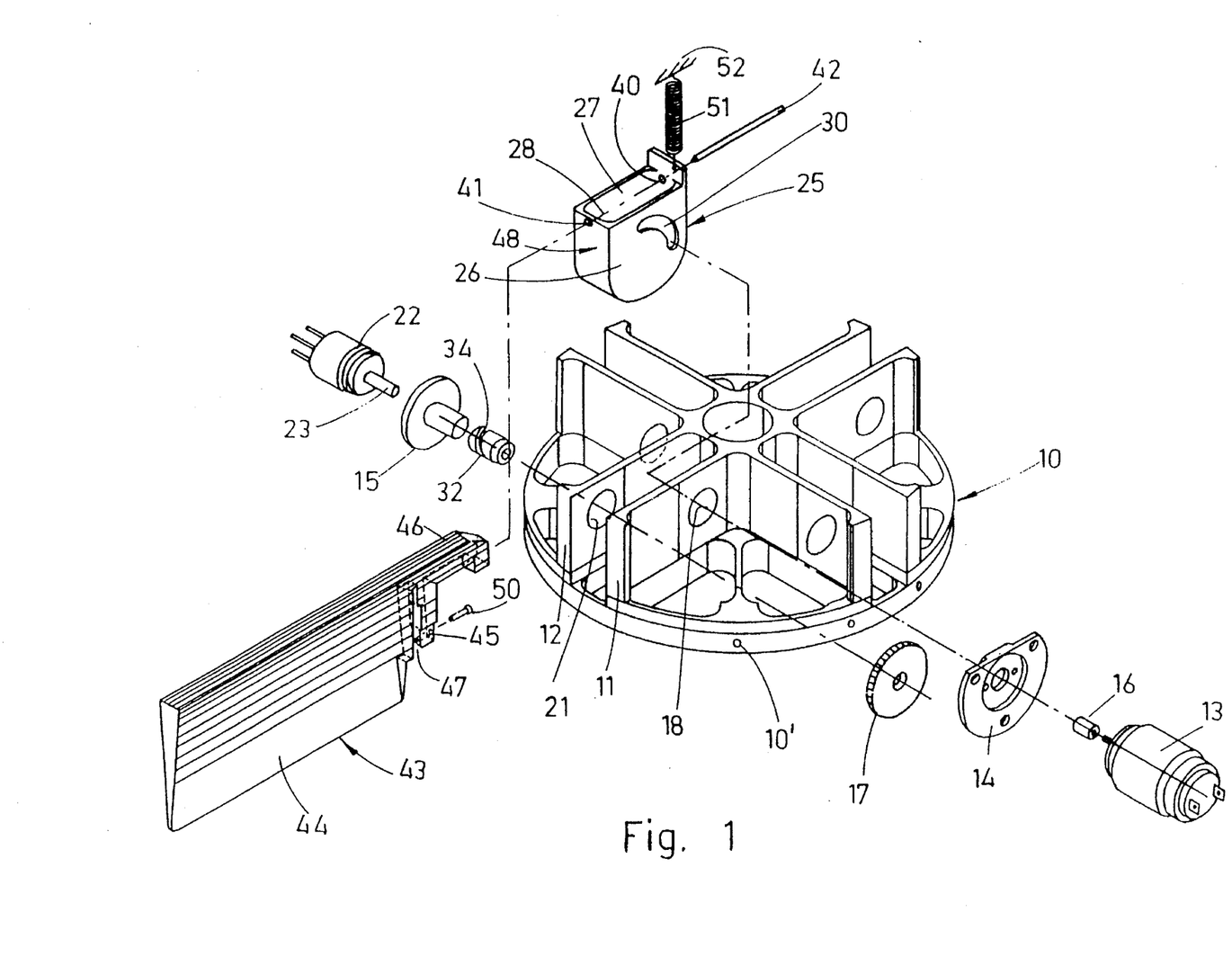
FIG. 1 is an exploded perspective view of a device according to an embodiment of the invention.

With reference now to the drawings, an embodiment of the device comprises the elements shown in FIG. 1. Except for the base, only the elements cooperating with one fin are illustrated and described, it being understood that in fact a plurality of fins are distributed about the periphery of the rocket assembly and to each one identical elements are associated.

Figure 4:
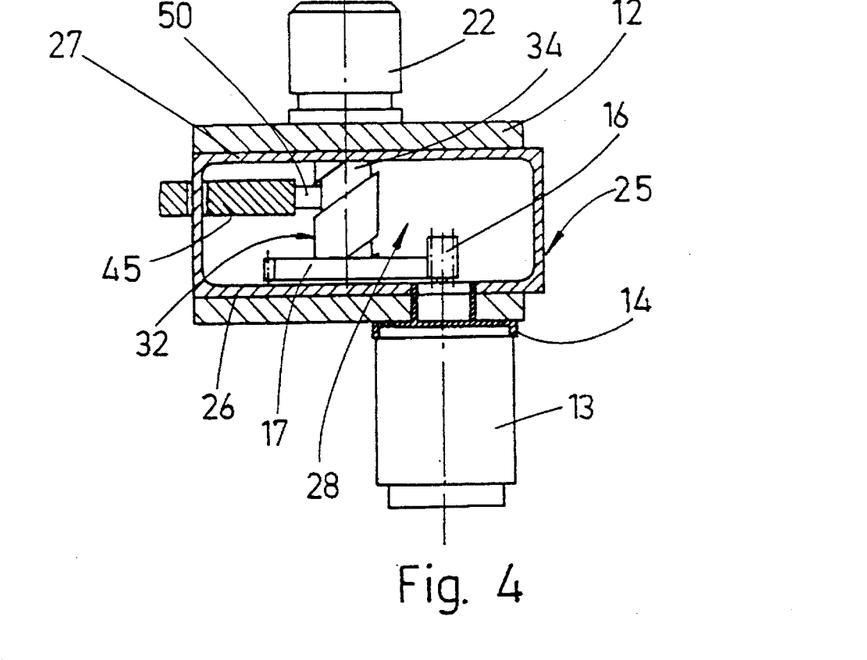
FIG. 4 is a cross-section of FIG. 2 taken on the plane IV—IV of FIG. 2, looking in the direction of the arrows.

Numeral 10 designates the base which is attached to the rocket body and is generally common to all the fins and the control devices associated therewith. In this embodiment, said base, which is attached to the rocket body in any suitable way, e.g. by means of screws engaging threaded apertures 10' at the periphery of the base 10, includes means for supporting four fins and the mechanisms for actuating them, as will be described hereinafter. For each fin, there are provided two partitions, 11 and 12. Partition 11 is provided with a seat 18 in which is mounted a bushing 14 which supports the motor 13, as particularly shown in FIGS. 4 and 6. Bushing 14 has a bore through which a pinion 16, keyed to the shaft of motor 13, passes.

Figure 5:
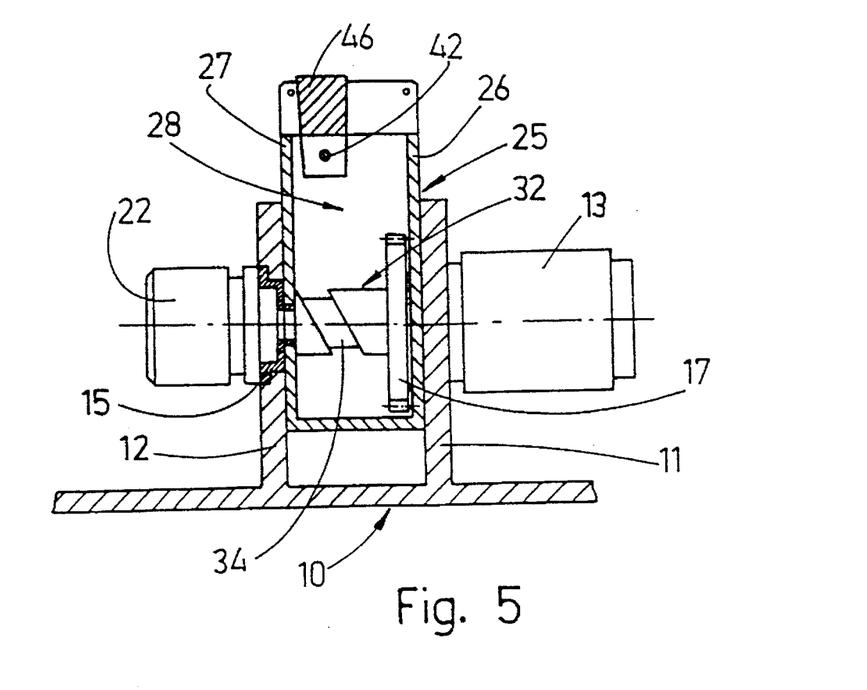
FIG. 5 is a cross-section of FIG. 2 taken on the plane V—V, looking in the direction of the arrows.
Figure 6:
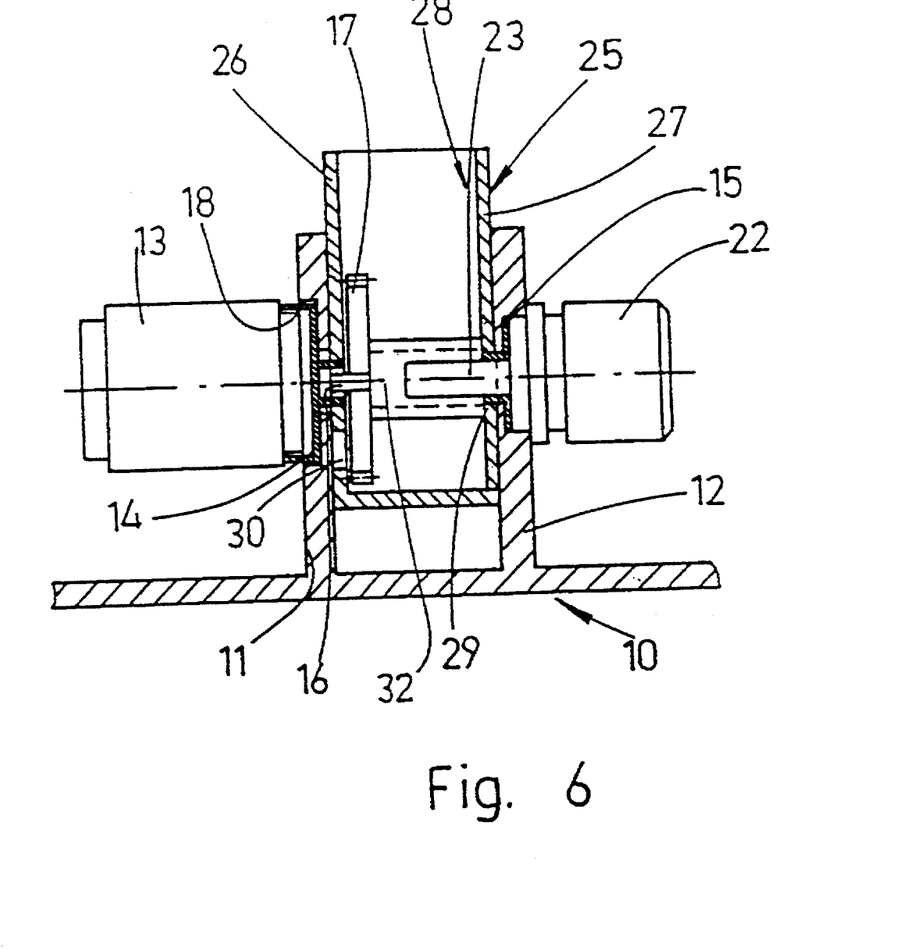
FIG. 6 is a cross-section of FIG. 3, taken on a plane passing through the main shaft and the motor shaft (plane VI—VI), looking in the direction of the arrows, the fin being omitted to simplify the drawing.

Partition 12 has likewise a seat 21 (FIG. 6), on which is mounted a bushing 15 supporting a potentiometer 22. As seen in FIGS. 5 and 6, said bushing 15 has a bore, through which the main shaft 23 passes. Shaft 23 is the main shaft of the entire device this shaft is rotatably supported by the potentiometer 22 bearing or bearings and no other bearings are required. Between partitions 11 and 12 is housed frame 25. In the embodiment described, the frame 25 comprises two boundary plates 26 and 27, which define an inner space 28. Frame 25 is pivoted on bushing 15. Boundary plate 26 is provided with aperture 30, which is shaped as a quarter of a circle having its center on the axis about which frame 25 rotates so that frame 25 may rotate without interfering with the motor shaft, and is sufficiently wide for pinion 16 to pass through it. Main shaft 23 carries a cam body 32 which is a cylinder keyed to the shaft and having therein a cam groove 34. Beyond cam body 32, main shaft 23 carries a toothed wheel 17 which meshes with pinion 16.

Figure 2:
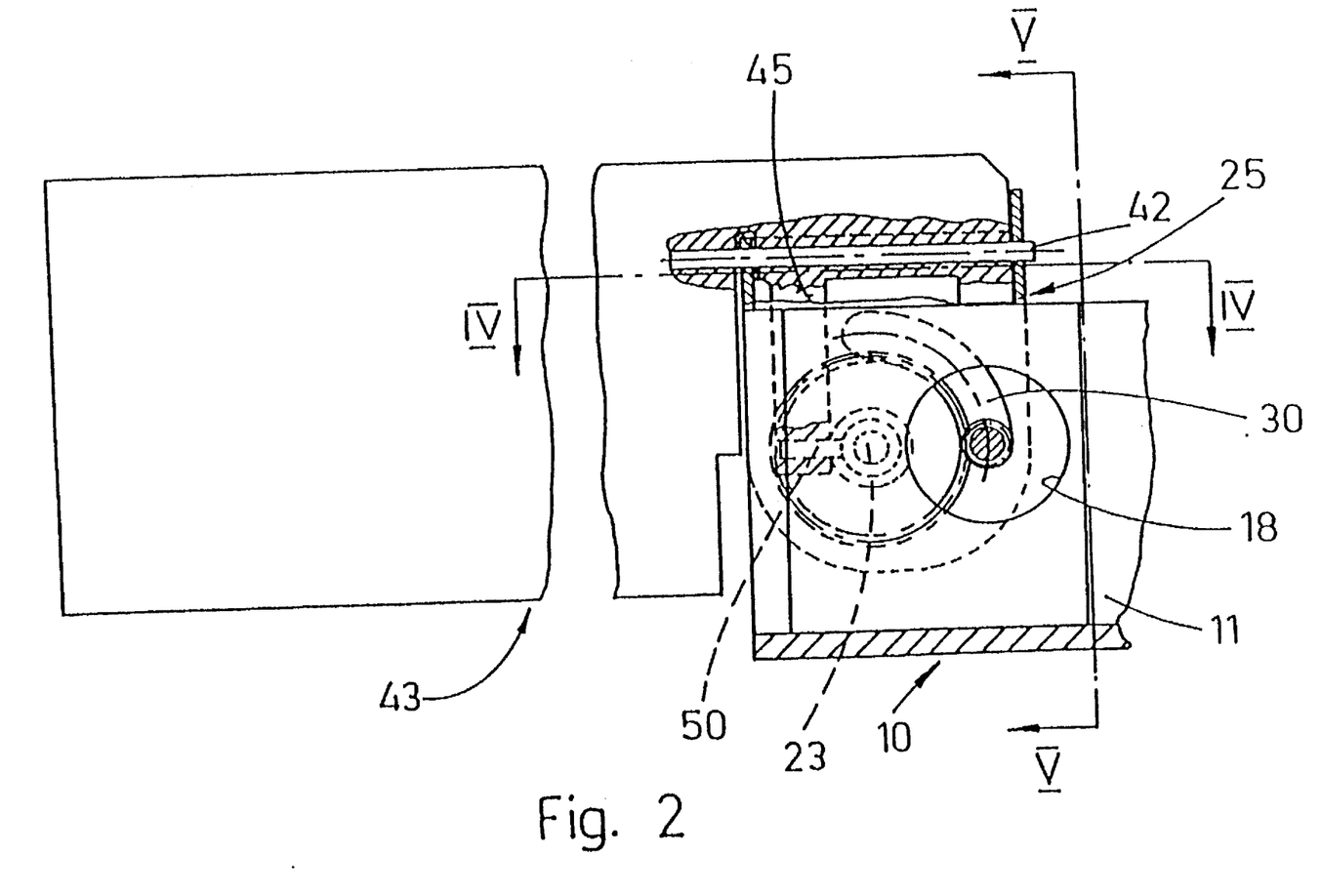
FIG. 2 is a view, partly in cross-sectiom, with the motor removed, of the same device in assembled condition, seen from a plane parallel to the axis of the rocket assembly, the fin being shown in its extended position.
Figure 3:
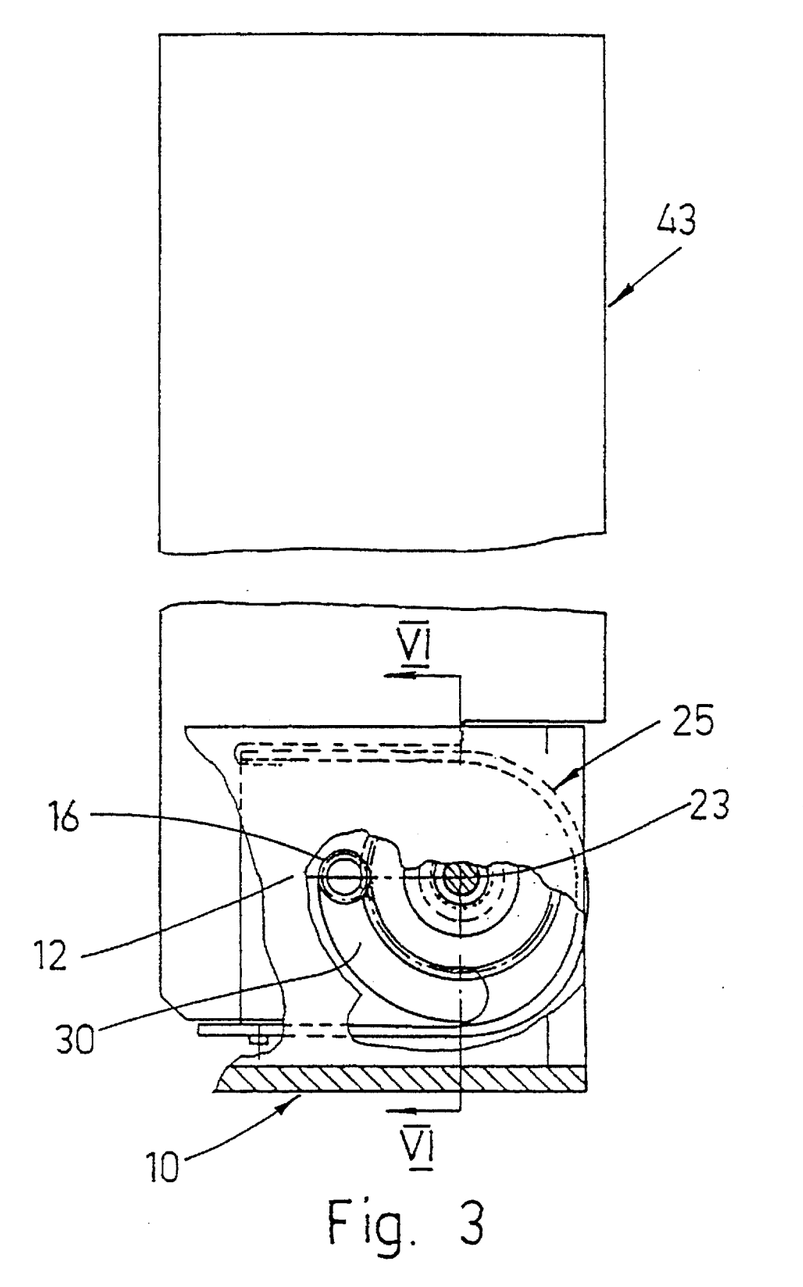
FIG. 3 is a view similar to FIG. 2, but from the opposite side, showing the fin in its retracted position, partly broken off.
Figure 7:
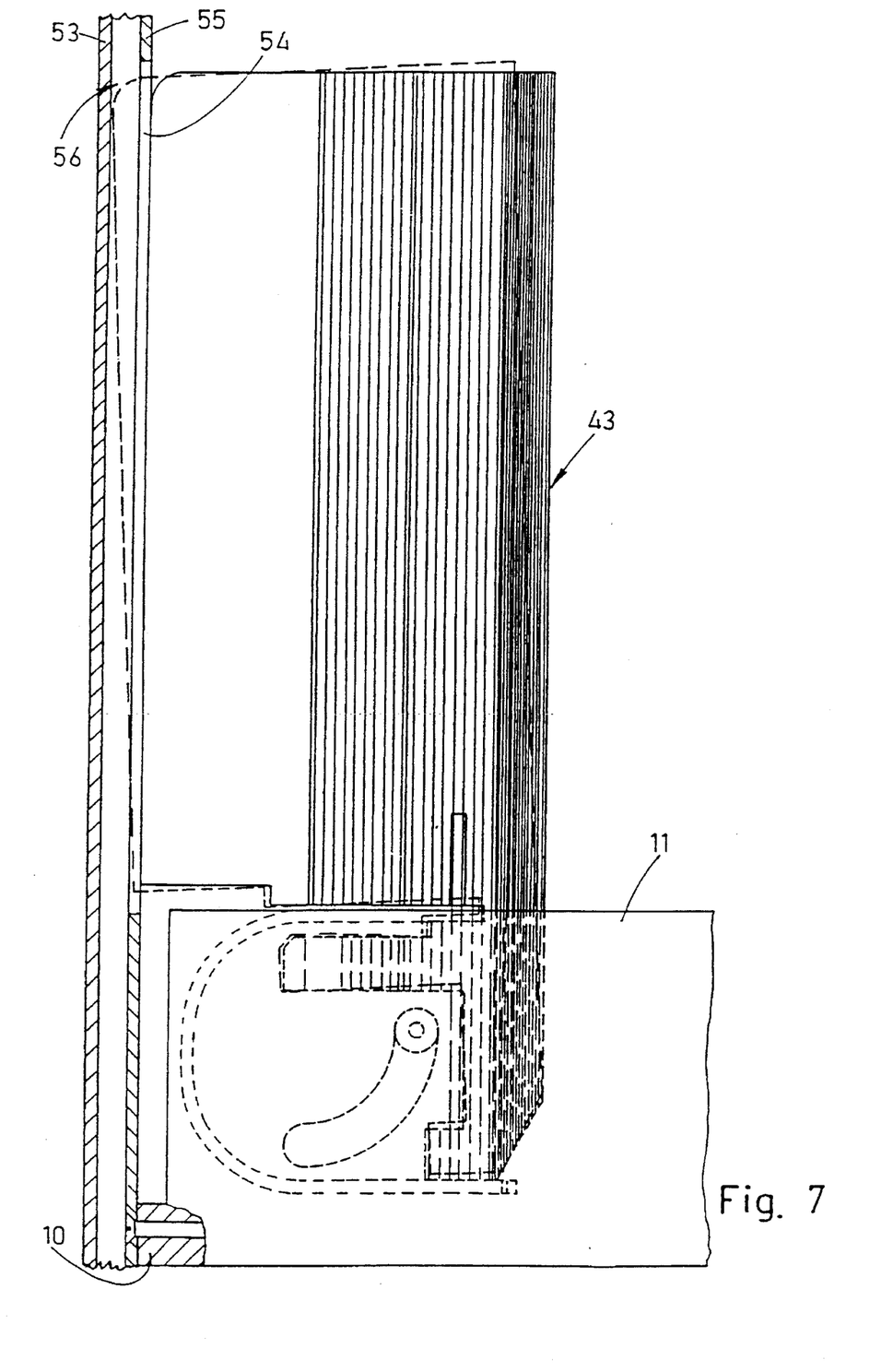
FIG. 7 is a view, partly in cross-section, similar to that of FIG. 2, but showing schematically a fin folded in the retracted position and the adjacent portion of a launching tube retaining it in said position.

Frame 25 also has therein bores 40 and 41 in which is supported pin 42. A fin 43 has its main portion 44 which is outside the inner space 28 of frame 25 and a follower portion 45 which is located inside said space. Portion 45 is separated from portion 44 by a space 47 which, when the device is mounted, accommodates end plate 48 of frame 25. Follower portion 45 carries a follower pin 50 which engages cam groove 34. Pin 42 penetrates into a bore of finger 46 of fin 43 and supports said pin in swingable positioned relationship to frame 25, as best seen in FIG. 2. A spring 51, attached to a fixed point 52 of rocket assembly, only schematically indicated in FIG. 1, constantly urges frame 25 to the operative position of FIG. 2 and therefore fin 43 to its extended position in which it protrudes outside the rocket assembly, passing through a slit 54 in the cylindrical wall 55 of the rocket (see FIG. 7). However, when the rocket is mounted on the launching pad, the tube 53 of said pad constrains the fin to remain close to the fully retracted position of FIG. 3, viz. the tip of fin penetrates into slit 54 but is retained by tube 53 as shown at 56 in FIG. 7. Therefore the frame 25 remains in an inoperative position close to the position shown in FIG. 3, wherein the spring 51 is distended. Said inoperative position may be defined by saying that the fin is substantially retracted within a surface enveloping the rocket assembly.

The operation of the device is as follows. When the rocket is in the launching pad, frame 25 is in the inoperative position of FIG. 7, and fin 43 in a retracted position, close to the position shown in FIG. 3. As soon as the rocket leaves the launching pad and exits from tube 53, spring 51 urges frame 25 to swing to its operative position of FIG. 2, and consequently the fin 43 to swing, through slit 54, to its extended position also shown in FIG. 2. Up to this point, motor 13 has not been energized and fin 43 may be in any starting angular position about pin 42. Nothing therefore has opposed the free swinging of frame 25 and fin 43, during which the shaft of motor 13 may have rotated freely or toothed wheel 17 has rotated in a planetary motion round pinion 16. Now the control system energizes the motor, determining a starting angular position of fin 43 about pin 42, said position depending on the point at which follower pin 50 engages cam groove 34, which in turn depends on the angular position of the shaft of motor 13. To this position will correspond a predetermined reference or initial angle of the center line of fin 43 with respect to a plane passing through the rocket axis (and perpendicular thereto) and through the axis of pin 42.

Motor 13 remains energized during the flight. As long as the slant of the fins is the proper one, the motor with its shaft remains locked in its angular position. When—in view of the flight plan and of the information provided by the potentiometer, as will be explained hereinafter—it is required to change the slant of the fin, motor 13 actuates pinion 16 to rotate, and this in turn rotates toothed wheel 17, main shaft 23 and cam body 33. Consequently, cam groove 34 slides over follower pin 50 and causes it to become displaced. The trajectory of said displacement of follower pin 50 is actually an arc of a circle centered on the axis of pin 42, but since it is relatively small, this arc of circle is very close to a straight line parallel to the main shaft 23. Displacement of follower pin 50 causes fin 43 to swing by a small angle about pin 42 and change its slant with respect to the aforementioned reference plane. Potentiometer body 22 does not rotate with main shaft 23 which is connected to the potentiometer shaft or which itself is the potentiometer shaft and measures the thereby the potentiometer angle by which said shaft has rotated and therefore the angular displacement of fin 43. The information provided by the potentiometer is communicated to the electronic control of the device and this actuates the motor 15 to impart to the fin the slant that is required by the flight program. When the required angular position has been attained, motor 15 is stopped and locked, with the fin, in said angular position. Motor 15, as controlled by the control system, determines at all times the angular position of the motor shaft and the slant of the fins. It is to be noted that the motor may be energized to adjust the slant of the fin, e.g. for the purpose of checking the operation of the device, even if the rocket is still in the launching pad and that the fins are in retracted position. This is an additional advantage of the invention.

It is seen that the device according to the invention is extremely simple, space-saving and immune from failures or malfunctions. It provides therefore a considerable progress over all prior art devices.

While an embodiment of the invention has been described by way of illustration, many modifications, variations and adaptations may be made therein by persons skilled in the art without departing from the spirit of the invention or exceeding the scope of the claims.

We claim:

1. Flight control device comprising in combination, with a flight object assembly:
   a base rigid with said flight object assembly;
   a main shaft rotatably supported in said base;
   a frame freely pivoted on an axis coaxial to said main shaft;
   guide means actuated by said main shaft;
   a motor supported on said base, said motor having a motor shaft;
   kinematic means connecting said motor to said main shaft to actuate said main shaft for rotation when the motor is actuated;
   pivot means carried by said frame and lying in a plane substantially perpendicular to said main shaft;
   a fin swingably mounted about said pivot means;
   a follower carried by said fin and engaging said guide means, to swing said fin about said pivot means when said guide means is actuated by said motor;
   said frame being swingable with respect to said base from an inoperative position, wherein said fill is substantially retracted within a surface enveloping said flight object assembly, to an operative position, wherein said fin extends outwardly of said surface; and means for causing said frame to assume said operative position in the absence of external constraints and wherein the guide means are cam means.

2. Flight control device according to claim 1, wherein the cam means comprise a rotatable, substantially cylindrical cam body keyed to the main shaft and having therein a shaped cam groove.

3. Flight control device according to claim 2, wherein the follower means carried by the fin is a projection engaging the guide means.

4. Flight control device according to claim 1, further comprising means for measuring the angular displacement of the fin from a reference position.

5. Flight control device according to claim 4, wherein the means for measuring the angular displacement of the fin from a reference position are means for measuring the angular displacement of cam means from a reference position.

6. Flight control device according to claim 4, wherein the means for measuring the angular displacement of the fin from a reference position comprise a potentiometer coaxial with the main shaft.

7. Flight control device according to claim 1, wherein the plane perpendicular to the main shaft on which the pivot means carried by the frame lies, passes through the axis of the flight object assembly.

8. Flight control device according to claim 1, wherein the pivot means carried by the frame is removably mounted in the frame.

9. Flight control device comprising in combination, with a flight object assembly:
   a base rigid with said flight object assembly;
   a main shaft rotatably supported in said base;
   a frame freely pivoted on an axis coaxial to said main shaft;
   guide means actuated by said main shaft;
   a motor supported on said base, said motor having a motor shaft;
   kinematic means connecting said motor to said main shaft to actuate said main shaft for rotation when the motor is actuated;
   pivot means carried by said frame and lying in a plane substantially perpendicular to said main shaft;
   a fin swingably mounted about said pivot means;
   a follower carried by said fin and engaging said guide means, to swing said fin about said pivot means when said guide means is actuated by said motor;
   said frame being swingable with respect to said base from an inoperative position, wherein said fin is substantially retracted within a surface enveloping said flight object assembly, to an operative position wherein said fin extends outwardly of said surface; and means for causing said frame to assume said operative position in the absence of external constraints and wherein the kinematic means connecting the motor and the main shaft comprises a pinion-toothed wheel coupling, the pinion being keyed to the motor shaft and positioned in the inner space of the frame and the toothed wheel being keyed to the main shaft.

10. Flight control device comprising in combination, with a flight object assembly:

a base rigid with said flight object assembly;

a main shaft rotatably supported in said base;

a frame freely pivoted on an axis coaxial to said main shaft;

guide means actuated by said main shaft;

a motor supported on said base, said motor having a motor shaft;

kinematic means connecting said motor to said main shaft to actuate said main shaft for rotation when the motor is actuated;

pivot means carried by said frame and lying in a plane substantially perpendicular to said main shaft;

a fin swingably mounted about said pivot means;

a follower carried by said fin and engaging said guide means, to swing said fin about said pivot means when said guide means is actuated by said motor;

said frame being swingable with respect to said base from an inoperative position, wherein said fin is substantially retracted within a surface enveloping said flight object assembly, to an operative position, wherein said fin extends outwardly of said surface; and means for causing said frame to assume said operative position in the absence of external constraints and wherein said frame has frame boundary elements having an inner space therebetween, at least one of said frame boundary elements having an aperture and wherein the motor shaft extends into the inner space of the frame, and said aperture in one of the frame boundary elements comprises an arcuate portion through which the motor shaft extends enabling the swinging of the frame from its inoperative to its operative position.

11. Flight control device comprising in combination, with a flight object assembly:

a base rigid with said flight object assembly;

a main shaft rotatably supported in said base;

a frame freely pivoted on an axis coaxial to said main shaft;

guide means actuated by said main shaft;

a motor supported on said base said motor having a motor shaft;

kinematic means connecting said motor to said main shaft to actuate said main shaft for rotation when the motor is actuated;

pivot means carried by said frame and lying in a plane substantially perpendicular to said main shaft;

a fin swingably mounted about said pivot means;

a follower carried by said fin and engaging said guide means, to swing said fin about said pivot means when said guide means is actuated by said motor;

said frame being swingable with respect to said base from an inoperative position, wherein said fin is substantially retracted within a surface enveloping said flight object assembly, to an operative position, wherein said fin extends outwardly of said surface; and means for causing said frame to assume said operative position in the absence of external constraints and wherein the means for causing the frame to assume its operative position in the absence of external constraints are spring means connected to the flight object assembly and the frame in such a positioned relationship thereto as to produce a moment about the main shaft which tends to rotate the frame from its inoperative to its operative position.

12. Flight control device comprising, in combination with a flying object assembly having an axis of symmetry, a plurality of fins symmetrically disposed about said axis of said flying object assembly, each fin having a retracted position, wherein said fin is retracted within a surface enveloping said flying object, and is movable to a fully deployed position by a single rotation, wherein said fin extends outwardly of said surface, and further comprising support means mounted on said flying object assembly, said support means comprising for each of said fins:

a frame connected to said fin by pivot means and being freely movable with respect to said support means about an axis perpendicular to a plane passing through said flying object assembly axis of symmetry, between an inoperative position, wherein said fin is retracted, and an operative position, wherein said fin is extended;

said fin being angularly displaceable about said pivot means;

means for causing said frame to assume its operative position in the absence of external constraints;

a main shaft rotatably supported on said support means and coaxial with said axis about which said frame is movable;

a motor supported on said support means, said motor having a motor shaft;

rotating means connecting said motor to said main shaft to rotate said main shaft when said motor is actuated;

guide means actuated by said main shaft; and follower means carried by said fin and engaging said guide means, to angularly displace said fin about said pivot means when said guide means is actuated by said motor.

13. Flight control device according to claim 12, wherein the frame is pivoted on the main shaft.

14. Flight control device according to claim 13, wherein the frame is pivoted on the main shaft through a bushing.

15. Flight control device according to claim 12, wherein the motor is supported on the frame through a bushing.

16. Flight control device according to claim 12, wherein the surface enveloping said flying object assembly is a cylindrical surface.

17. Flight control device according to claim 12, wherein the frame comprises boundary elements which define an inner space therebetween, at least one of said boundary elements having an opening therein.

18. Flight control device according to claim 12, wherein said flying object assembly is housed in a tube of a launcher pad before said assembly is launched and the external constraints opposing the rotation of the frame are substantially constituted by the tube of the launcher pad.

19. Flight control device as claimed in claim 12, wherein said flying object assembly is a rocket assembly.

* * * * *